United States Patent [19]

Schmidt

[11] Patent Number: 4,746,481

[45] Date of Patent: May 24, 1988

[54] PROCESS FOR ACCELERATING HARDENING OF CEMENT WITH FIBRE-REINFORCED AND CEMENT-BOUND PLATES

[75] Inventor: Ernó Schmidt, Szombathely, Hungary

[73] Assignee: Nyugatmagyarorszagi Fagazdasagi Kombinat, Szombathely, Hungary

[21] Appl. No.: 821,263

[22] Filed: Jan. 22, 1986

[30] Foreign Application Priority Data

Jan. 23, 1985 [HU] Hungary .................................. 260/85

[51] Int. Cl.⁴ .............................................. C04B 15/14
[52] U.S. Cl. .............................. 264/82; 264/DIG. 43; 264/333
[58] Field of Search ................... 264/82, 333, DIG. 43

[56] References Cited

U.S. PATENT DOCUMENTS

| | | |
|---|---|---|
| 109,669 | 11/1870 | Rowland . |
| 3,468,993 | 9/1969 | Bierlich .................................. 264/82 |
| 4,093,690 | 6/1978 | Murray .................................. 264/82 |
| 4,117,060 | 9/1978 | Murray .................................. 264/82 |
| 4,362,679 | 12/1982 | Malinowski .......................... 264/82 |
| 4,469,655 | 9/1984 | Kiss ....................................... 264/82 |

FOREIGN PATENT DOCUMENTS

| | | |
|---|---|---|
| 110792 | 3/1944 | Sweden . |
| 584666 | 2/1977 | Switzerland . |
| 1460284 | 12/1976 | United Kingdom . |

Primary Examiner—James Derrington
Attorney, Agent, or Firm—Schweitzer & Cornman

[57] ABSTRACT

The invention relates to a process for accelerating hardening of cement in fibre-reinforced and cement-bond plates and solids respectively. The essence of the process lies in that a composition known in itself containing water, fibrous material and cement is placed between the pressure plates of a press, compressed, simultaneously with pressing a flange of increased density is formed on the profile to be produced; the medium between the gasproof or quasi gasproof boundary surface is carbonized wih $CO_2$ gas thereafter pressure is reduced.

5 Claims, 2 Drawing Sheets

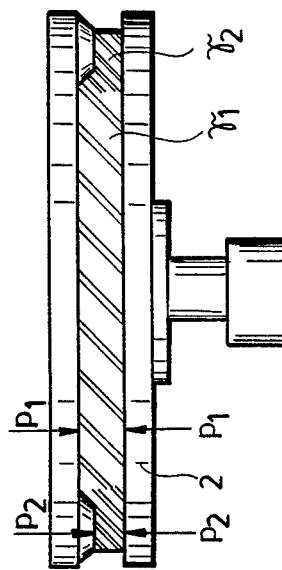
Fig.1.a
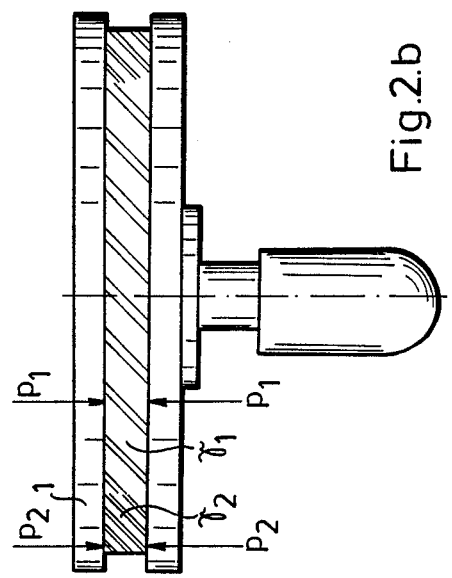
Fig.1.b
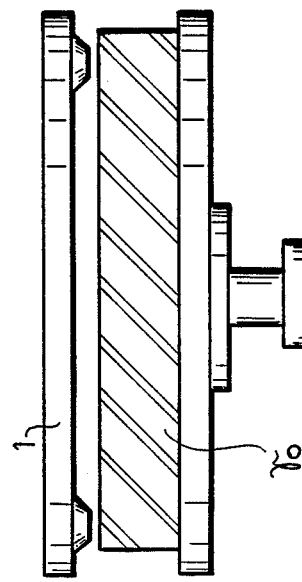
Fig.2.a
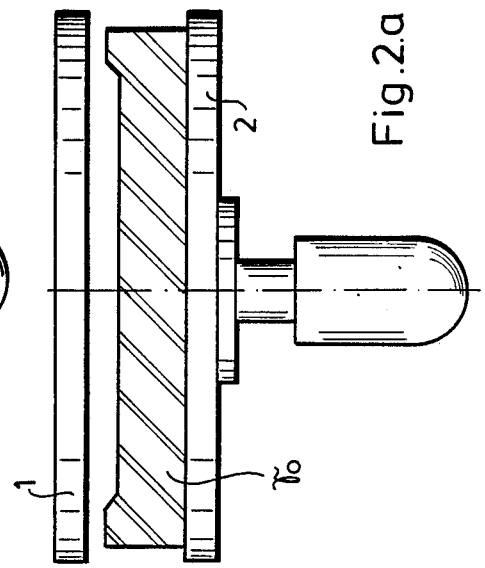
Fig.2.b

PROCESS FOR ACCELERATING HARDENING OF CEMENT WITH FIBRE-REINFORCED AND CEMENT-BOUND PLATES

BACKGROUND OF THE INVENTION AND DESCRIPTION OF PRIOR ART

The invention relates to a process for accelerating the hardening of cement with fibre-reinforced and cement-bound plates or profiles.

It is a well known fact that for accelerating hardening of cement the so-called carbonization process can be used as has been applied in the concrete and ceramic industry.

The essential feature of said process lies in having $Ca/OH_2$ compound present in a significant proportion in cement mortars and cement admixed with water, which is converted to limestone under the influence of $CO_2$ gas. This process—namely carbonization—is taking place very quickly and the resulting bonds interconnecting the molecules of limestone are so strong that concrete strength may reach about 35 to 50% of the strength of concrete at the age of 28 days in just 5 to 30 minutes, in spite of the fact that the hydration process has not yet begun.

The carbonization process and mode of application are detailed in U.S. Pat. Nos. 109,669; 3,468,993; 4,362,679 and 4,093,690, as well as in GB-PS No. 1,460,284; Swedish Patent No. 110,792 and Swiss Patent No. 584,666.

From the patents enumerated it becomes obvious, in so far as:

in general, the material containing cement and intended to be carbonized is arranged in a space which can be closed, in said space, by introducing $CO_2$ gas, overpressure is established while $CO_2$ gas penetrates into the pores of the cement-containing material stored therein, in the space which can be closed, first of all, a vacuum is produced by exhausting the air, thereafter $CO_2$ gas is introduced, as a consequence, $CO_2$ gas easily penetrates into the pores of the cement-containing material stored therein.

However, known and used technical solutions serving for the realization of the carbonization process involves a not negligible drawback; in so far as manipulation of the cement-bound fibrous material requires a closed space, the construction thereof is most expensive.

A further problem lies in efforts to obtain a properly airproof sealing; that is a most complex task, even for those skilled in art.

SUMMARY OF THE INVENTION

The aim of the invention is to develop a process for accelerating hardening of cement, with fibre-reinforced and cement-bound plates or profiles. The known deficiencies of the prior art processes can be eliminated. By application, of the present method, operating with simple technology, utilizing the properties of the material to be processed, a product can be obtained which meets the requirements of the material application, in all respects.

We have found that fibre-reinforced cementous material-compositions have a plurality of advantageous properties which can be utilized for establishing the closed space in performing the carbonization process.

First of all, we refer to the characteristic that any fibrous material, of whatever origin, is always elastic.

A further advantageous feature to be used to advantage is that the fibrous materials, cement-bound fibrous materials, with a low water content (in the range of between about 30 to 60%) have a not fully compacted bulk. They can be compressed; to compress them, force must be exerted. In general, loose bulk is 2–3 times as large as the final bulk of the product.

The compressed cement-bound fibrous material, being elastic, springs back, more or less. That results in an increase in volume, if the pressing force stops prior to setting of the cement.

Accordingly, the essence of our invention is based on the recognition, in so far as utilizing the aforementioned advantageous characteristics of the cement-bound fibrous material, of closing of the sidefaces in a most easy manner by the fibrous material itself. As a consequence, a closed space can be formed in the inside of the fibrous material in either of the following ways:

On the edges of the product to be produced—on four sides in a flange-like manner—cement bound fibrous material is compressed by means of a flange having been installed on the pressure plate of a press to a thickness being less, than the nominal thickness.

On the edges of the product to be produced—on four sides in a flange-like manner—a larger quantity of fibrous material is introduced, whereby after having compressed it to the nominal thickness, a material part with increased density is obtained.

Whichever of the aforementioned solutions is used, on the edges on the cement-containing fibrous material, in a flange-like manner, fibrous material with an increased density will be formed, being less permeable to the gas, than the fibrous material within the boundaries of the flange. By properly selecting density, airproofness can be achieved which is needed for implementation of carbonization.

The process according to the invention will be explained in detail by means of preferred modes of performance, and by reference to the drawings enclosed, wherein:

BRIEF DESCRIPTION OF THE DRAWING

FIG. 1/a is a side elevational view of one embodiment of the invention and shows the flange installed on the pressure plate of the press, with the press in its open position, and also shows existing physical and mechanical characteristics of the material in this first state;

FIG. 1/b is a view similar to that shown in FIG. 1/a, however, with the press shown in its closed position;

FIG. 2/a is a side elevational view of another embodiment of the finished product with a flange being formed prior to pressing due to the increased quantity of fibrous material formed as the flange with the press shown open;

FIG. 2/b, is a view similar to that shown in FIG. 2/a, however with the press shown in its closed position;

EXAMPLE 1

Figure 3:
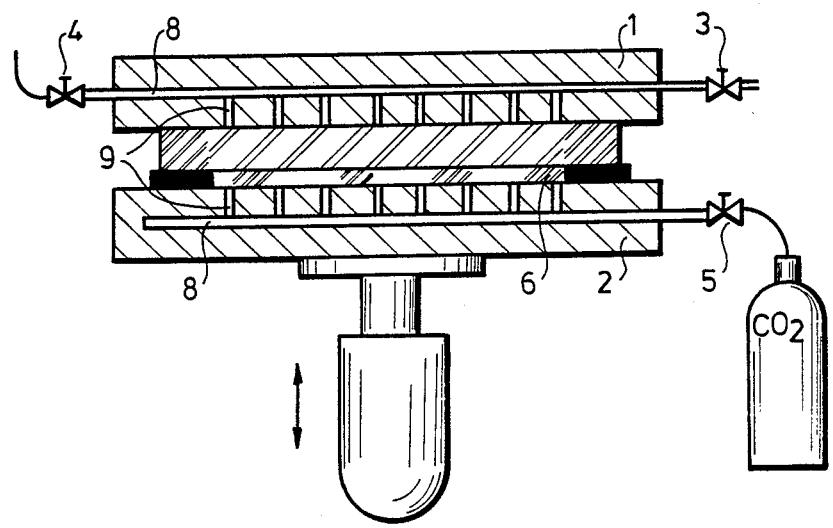
FIG. 3 illustrates the mechanism according to example 1.
Figure 4:
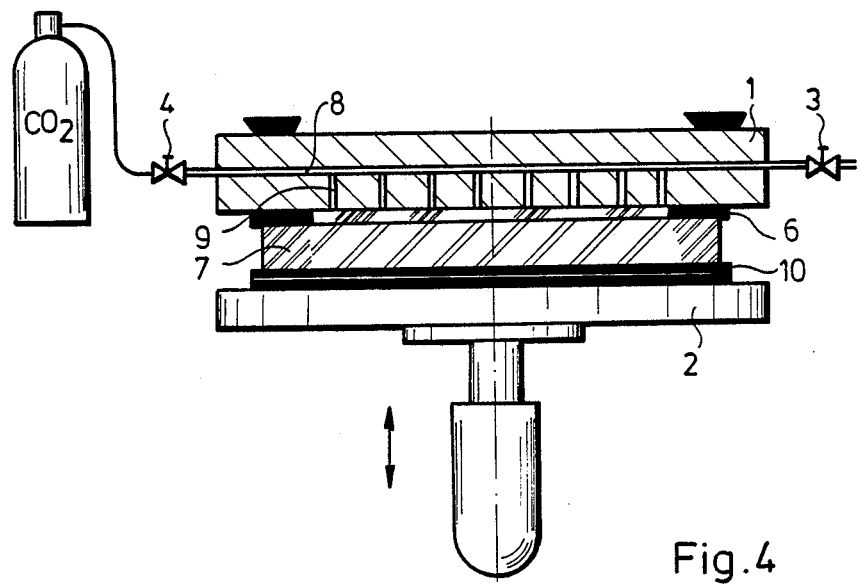
FIG. 4 shows the mechanism according to example 2.

Pressure plates 1 and 2 are the components of a hydraulic press. The hydraulic cylinder of the press lifts and lowers the pressure plate 2 with respect to stationary plate 1. In the inside of the pressure plates, bores 8 are formed in the longitudinal and transverse direction, respectively, (see FIG. 3). Bores 9 extend perpendicularly to the face surface of the pressure plates 2 and connect with bores 8. Outlets of the bores 8 of the pressure plate 1 are provided with valves 3 and 4. Bores 8 of the pressure plate 2 communicate with valve 5. The plate 6 carries the moist cement-containing fibrous material. The fibrous material is placed between the pressure plates of the press by movement of plate 2 carrying plate 6 towards plate 1. The four sides of the plate 6, having width of a few centimeters, are not perforated, while the remaining part is formed with close-space perforations, having the character of a sieve. The non perforated zone fulfills the function of sealing on all sides between the perforated plate and the pressure plates. Of course, material quality and processing should be properly chosen.

Cement-containing fibrous material to be compressed is strewed onto the plate 6. As previously mentioned, on the flange of the fibrous material, on all four sides, an increased quantity of fibrous material is applied.

While operating the press, the loose fibrous material becomes compacted. During compression, air from the pores of the fibrous material escapes via valve 3. Due to compressive force of plates, the fibrous material is pressed, the force being in relation to the extent of the springing back force. As a result, gasproof conditions are achieved on the surface of the pressure plate. As soon as the press compresses the fibrous material to the volume of production, valves 3 and 4 are turned off. In this state, the two faces of the fibrous material are closed by the pressure plates of the press, while the lateral faces of the fibrous material become gastight under the influence of the flange of increased density. Now valve 5 is opened and $CO_2$ gas is fed via the plate 6 through bores 8 and 9 to the cement-containing fibrous material. The gas, being provided at an overpressure-state displaces any air left in the pores of the fibrous material and causes the air to pass into the bores of the pressure plate. As a consequence, conditions of carbonization are established. After having finished the carbonization process, steam can be introduced into the cement-containing fibrous material to promote safe completion of hydration.

EXAMPLE 2

Pressure plates 1 and 2 are the components of a hydraulic press. An hydraulic cylinder of the press lifts and lowers the pressure plate 2; the pressure plate 1 is not moving, i.e., it is fixed. In the interior of pressure plate 1, longitudinal and transverse bores 8 are formed, to which further bores 9 are connected, running perpendicularly to the face or surface of the pressure plate. The bores on the inside of the pressure plate have two outlets which are provided with valves 3, 4. The pressure plate 2 is solid, no bores are contained therein. A plate (not numbered in drawing) is located below plate 10 and carries the wet fibrous material containing cement, by the aid of which the material is placed between the pressure plates 1 and 2 of the press.

On all four sides of the plate 6, there is a 3 to 4 cm wide unperforated zone, the remaining or central part of plate 6 is formed with close-set or spaced perforations i.e., it has the character of a sieve. On both sides the unperforated zone performs the function of sealing.

Wet, cement-containing fibrous material 7, to be pressed, is strewn on plate 10. On all four sides of plate 10, below the area defined by the unperforated zone of the plate 6, the quantity of fibrous material is increased by about 10 to 15%.

While the hydraulic press is operated, the fibrous material becomes compacted, and air is leaving the pores of the compressed fibrous material. The material excess of 10–15%—as mentioned above—is fibrous material of larger bulk density; as a consequence, a flange is formed functioning as a seal during the carbonization process. When the press is closed, displaced air is discharged to the perforated part of the plate 6, via the valve 3. Fibrous material is compressed to a volume, being less than the final produced size. In this case, the fibrous material lying between the pressure plate of the press contains less pores, than in the state of final volume, while the pressure plates of the press maintains balance with the relaxation pressure of the fibrous material.

Now valve 4 is opened and $CO_2$ gas is allowed to flow into the bores 8, 9 of the pressure plate 1. $CO_2$ gas displaces any residue air in said bores through valve 3. After having finished flushing with gas, valve 3 is closed. Thereafter, hydraulic pressure in the pressure piston is reduced to such an extent that the pressure plates can come apart, thus enabling the fibrous material to spring back to the final size. As a consequence of relaxation, in the inside of the fibrous material depression, pores are formed, facilitating penetration of $CO_2$ gas thereto. $CO_2$ gas flow can be further enhanced by introducing gas of an even higher pressure (to the 15 to 20 atm).

Either of the two developed methods can be used for realizing carbonization; the process taking place in 3.5–4 minutes with a plate thickness of about 10 mm. Pre-hardening of the cement-bound fibrous material reaches 40 to 50% of the 28 day strength. $CO_2$ gas used in the chemical process amounts to 8–10% of the weight of the cement having been admixed to the fibrous material.

I claim:

1. A process for accelerating the hardening of cement in a composition containing water, cement and fibrous material, comprising the steps of:
   (a) forming said composition into a predetermined shape having an outer perimeter portion extending about the outer perimeter of said predetermined shape and an internal portion within the confines of said outer portion,
   (b) positioning said predetermined shape of said composition between the pressure plates of a press,
   (c) utilizing said pressure plates to compress said internal portion of the formed shape of said composition to a first predetermined density,
   (d) utilizing said pressure plates to compress said outer perimeter portion of the formed shaped of said composition to a second predetermined density, said second predetermined density being greater than said first predetermined density and being of sufficient density to compress said outer perimeter portion to a gas leak tight condition,
   (e) applying $CO_2$ to said internal portion of the formed shape of said composition, whereby said $CO_2$ is confined to be within said internal portion by said pressure plates and said gas leak tight compressed outer perimeter portion.

2. The method according to claim 1, further characterized by increasing the compression of said outer perimeter portion by forming said outer perimeter portion to a thickness which is greater than the thickness of said internal portion.

3. The method according to claim 1, further characterized by increasing the compression of said outer perimeter portion by forming an area of increased compressive force produced by said pressure plates and applied to said outer perimeter portion.

4. The method according to claim 1, further characterized by applying overpressurized $CO_2$ to said internal portion to displace air therefrom.

5. The method according to claim 1, further characterized by after applying $CO_2$ reducing the compressive forces of said pressure plates.

* * * * *